United States Patent [19]

Seabrooke

[11] 4,006,549
[45] Feb. 8, 1977

[54] PORPOISE-RELEASING TUNA PURSE SEINE

[76] Inventor: James M. Seabrooke, 1550 Mountain View Ave., Petaluma, Calif. 94952

[22] Filed: Mar. 18, 1976

[21] Appl. No.: 668,295

[52] U.S. Cl. ................................. 43/14; 43/106
[51] Int. Cl.² ....................................... A01K 73/12
[58] Field of Search ............................. 43/14, 106

[56] References Cited

UNITED STATES PATENTS

| | | | |
|---|---|---|---|
| 379,751 | 3/1888 | Winsor | 43/14 |
| 721,517 | 2/1903 | Harris | 43/14 |
| 3,849,927 | 11/1974 | Gonsalves | 43/14 |

Primary Examiner—Louis G. Mancene
Assistant Examiner—Daniel J. Leach
Attorney, Agent, or Firm—Thomas M. Freiburger

[57] ABSTRACT

A tuna fishing purse seine and a method for its operation provide for protection and release of porpoise captured along with a school of tuna. The seine includes an inner, upper net in addition to the main net, positioned alongside the main net and connected to it in one area. The two nets, each having its own corkline, are set together but may be independently pursed. During setting and pursing, tuna generally sound a considerable distance below the surface, while porpoise tend to remain near the surface for air, so that the porpoise are separated from the tuna by the pursing of the inner, upper net. The pursing of the upper net sweeps it over to one area of the main net, where porpoise can be released by the opening of a release panel or gate in the main net in that area. The captured tuna may then be sacked up in the usual manner, but using the outside of the pursed inner net as a portion of the enclosure retaining the tuna.

16 Claims, 7 Drawing Figures

PORPOISE-RELEASING TUNA PURSE SEINE

BACKGROUND OF THE INVENTION

The invention relates to fishing, and more particularly to a method and apparatus for capturing tuna by purse seining while separating and releasing substantially all porpoise captured along with the tuna.

In the recent past the tuna fishing industry has been nearly completely transformed from the use of the bait and line method to the use of large nets or seines which draw together or purse at their deep ends to trap whole schools of tuna. These purse seines are usually about one half mile long and about 350 feet in depth. They are set by a seiner, or fishing boat adapted for use of the seine, along with a skiff which tows the leading or bunt end of the seine out from the seiner to encircle the school of tuna. When the set is complete both ends of the seine are retained to a side of the seiner, the seine being supported by a corkline or float line attached to its upper side. At intervals along the deep edge of the seine are purse rings which support a purse line, both ends of which are held at the seiner. The purse line is drawn to purse the bottom of the net and trap the school of fish.

To harvest the catch the rear or hauling end of the seine is progressively hauled aboard the seiner while corresponding purse rings are released in sequence to enable the net to be stacked in an ordered fashion on the deck. The net remaining in the water is thus shortened to a greater and greater extent, concentrating the fish into a diminishing space. When only a small fraction of the seine remains, it is gathered alongside the seining vessel and the adjacent skiff to "sack up" the catch, concentrating perhaps 40 to 50 tons of fish into a very small pocket of the net between the seiner and the skiff.

The sacked fish are then hauled or brailled out of the net and into tanks aboard the seiner by a dipping net known as a brail. When the operation is completed the remainder of the seine is hauled aboard, with corresponding purse rings released in sequence as described above, and stacked on the deck. Since the bunt end of the seine is brought aboard last, the seine is prepared for the next set.

The above seine fishing method and apparatus are fully described, explained and illustrated in the article, "Purse Seine Revolution in Tuna Fishing," Richard L. McNeely, *Pacific Fisherman*, Vol. 59 No. 7 (June 1961).

A principal method of finding schools of tuna, particularly Yellowfin tuna in tropical waters, is to locate groups of porpoise, which commonly associate with schools of Yellowfin tuna. Being marine mammals, the porpoise breathe air and thus tend to remain close to the surface. The tuna intermix with the porpoise for reasons which are not fully understood. Although this sometimes helps fishermen in locating tuna, it also gives the fishermen serious problems in that porpoise are inevitably captured along with the school of tuna as the seine is pursed, hauled and sacked. Large numbers of porpoise are often injured and killed with the tuna catch. The fins of the porpoise become entangled in the net, which usually has about a 4-inch mesh, and many are held below the water surface for prolonged periods, causing drowning. Many are thought to die merely from shock as they frantically attempt to escape the ever-diminishing net enclosure. It has been estimated that as many as 300,000 porpoise per year have been killed incidental to the tuna seining activities of U.S. fishermen.

Primarily in response to the legal requirements of the federal Marine Mammal Protection Act of 1972 (16 U.S.C. paragraph 1361), seining tuna fishermen have attempted to reduce this incidental porpoise mortality. The Act mandates that incidental porpoise kill be lowered to near zero with quota-type limits imposed. Of course it is also in the interests of the fishermen to reduce the kill rate, since serious depletion of porpoise stocks may adversely affect their ability to locate tuna.

One method which has been used by seiners in an effort to release porpoise from the net, once encircling maneuvers have been completed, is "backing down" or reversing the seining vessel to pull the most remote portions of the net under the water surface, thereby attempting to allow porpoise to pass over the corkline of the net in this area. Since tuna also try to escape the net along with the porpoise, the vessel must perform a series of backing down and stopping maneuvers, so that the net can be allowed to return to the surface via its corkline after each backing down. Net tenders in auxiliary boats must be used to assist the porpoise out and help raise the net to stop the escape of tuna.

By another method several seine skiffs, or auxiliary boats, have been used to pull outwardly at several points on the perimeter of the net to keep it in an open configuration so that it does not collapse or fold over upon itself to entrap and drown porpoise. Also, removal of the porpoise by hand during sacking up has often been resorted restored to. This involves members of the crew in skiffs alongside the net.

Gear modifications seeking to reduce incidental porpoise kill have included the extensive use of small-mesh netting in the seine to avoid the snagging of porpoise fins, flippers and snouts as the porpoise attempt to escape. A more limited modification has been the installation of a "Medina Panel" of small-mesh netting only in the center of the net for a depth of about 100 feet. The purpose of the panel, which has usually included about 1 ¼-inch mesh instead of the usual 4 ⅛-inch mesh, was to prevent the entanglement of porpoise in the net during backing down maneuvers.

Seining crews have also experimented with socalled "large volume" or more extensive nets to provide more water surface area, in conjunction with pulling outwardly at several points on the net to prevent folding over of portions of the net as discussed above. This type net and the accompanying method were also supposed to help prevent porpoise from being snagged, trapped and drowned.

Although these methods and gear modifications have reduced porpoise kill to some extent, their success has been very limited. Moreover, the described methods have involved inordinate amounts of labor and time and have been very costly to the tuna fishing industry. In spite of the difficulty and expense of these attempts to solve the porpoise problem, the goals of the Marine Mammal Protection Act have not been met.

SUMMARY OF THE INVENTION

The method and apparatus of the present invention provide a solution to the problem of incidental porpoise kill without requiring a great deal of additional labor and time in seining operations. The principle of the invention is to first separate and isolate the porpoise from the tuna, then release the porpoise and resume operations for harvesting the tuna catch.

It has been found that when encircled by a seine and when pursing begins, drawing the seine together more closely, tuna generally sound rather deeply. Little is known about this behavior, and the tuna may or may not sound below the thermocline, which generally is located some 80 to 90 feet below the surface. In any event, the tuna are in the lower portions of the net when pursing is completed. Porpoise, however, tend to remain near the surface and their source of air, at least as long as the net has not been greatly shortened and sacking up has not commenced to cause frenzied behavior in the porpoise.

With this separation principle in mind, the invention provides method and net apparatus for isolating the porpoise near the surface during net pursing, thereby separating the tuna and porpoise. The separation is accomplished through the provision of a second net which is set along with the main net but may be independently pursed simultaneously with the main net. This second net is positioned closely adjacent to but inward of the main net when the main net is set in the usual generally cylindrical configuration. Provided with its own corkline and purse rings and extending downward only a fraction of the depth of the main net, preferably about 70–80 feet, the second or porpoise net sweeps across the surface as it is pursed, thereby trapping porpoise near the surface and separating them from the tuna when pursed. Thus, with both nets pursed the tuna are trapped in a large enclosure partially open to the surface except in the area of the pursed porpoise net, which forms an upper enclosure toward one side for retaining the porpoise.

In order to release the porpoise prior to shortening of the main net and sacking up operations, a porpoise release gate is provided in the main net adjacent to the surface, in a front section of the main net which forms a wall of the pursed porpoise net. The porpoise net is somewhat shorter in length than the main net, with its front end connected to the main net along a vertical line spaced a distance from the main net's front end. The release gate is positioned in the main net between the front ends of the two nets. To release the porpoise by opening the gate, which comprises a preferably rectangular section of the net, a crew member in a skiff need only disengage releasable lines accessible from the surface.

When the porpoise have been released through the open gate, shortening of the main net commences in the usual manner, with the back or hauling end of the net being progressively brought aboard the seining vessel and stacked. Purse rings, preferably of the openable type which may be disengaged from the purse line one by one, are sequentially released to facilitate net stacking according to the usual procedure. At this point the porpoise net is pursed and confined to one area of the net enclosure, adjacent to the front or bunt end of the main net. When hauling in of the main net progresses to the point at which the porpoise net is connected, the porpoise net may be hauled in along with the main net, with split purse rings of the porpoise net successively released as necessary to free the porpoise net for stacking. At this time the tuna are being retained in a progressively smaller enclosure bounded by the main net and, near the surface, by the adjacently positioned porpoise net, when in this front section of the main net is pursed to the main net. The porpoise release gate of the main net is thereby isolated from the tuna by the porpoise net.

As shortening of the nets continues, stacking of both nets also continues. The nets are separated at their original line of connection by means of snap hooks and rings, so that they can be separately stacked in preparation for the next set. The ends of the porpoise net are preferably interchangeable to facilitate easy reassembly of the nets for the next set.

Meanwhile the tuna are concentrated in a smaller and smaller area defined by the main and porpoise nets, until crew members in skiffs begin gathering the nets alongside the main vessel and the skiffs to confine the tuna into a small area near the main vessel, as has been the usual practice with a single net. Brailing of the tuna into seining vessel completes the catch, and the remainder of the nets are hauled aboard and stacked as discussed above.

It is therefore seen that the present tuna fish seining method and apparatus facilitate the separation and release of porpoise from a netted school of tuna without excessively time-consuming operations and without appreciably disrupting the normal procedure for bringing in a tuna catch.

DESCRIPTION OF THE PREFERRED EMBODIMENT

Figure 1:
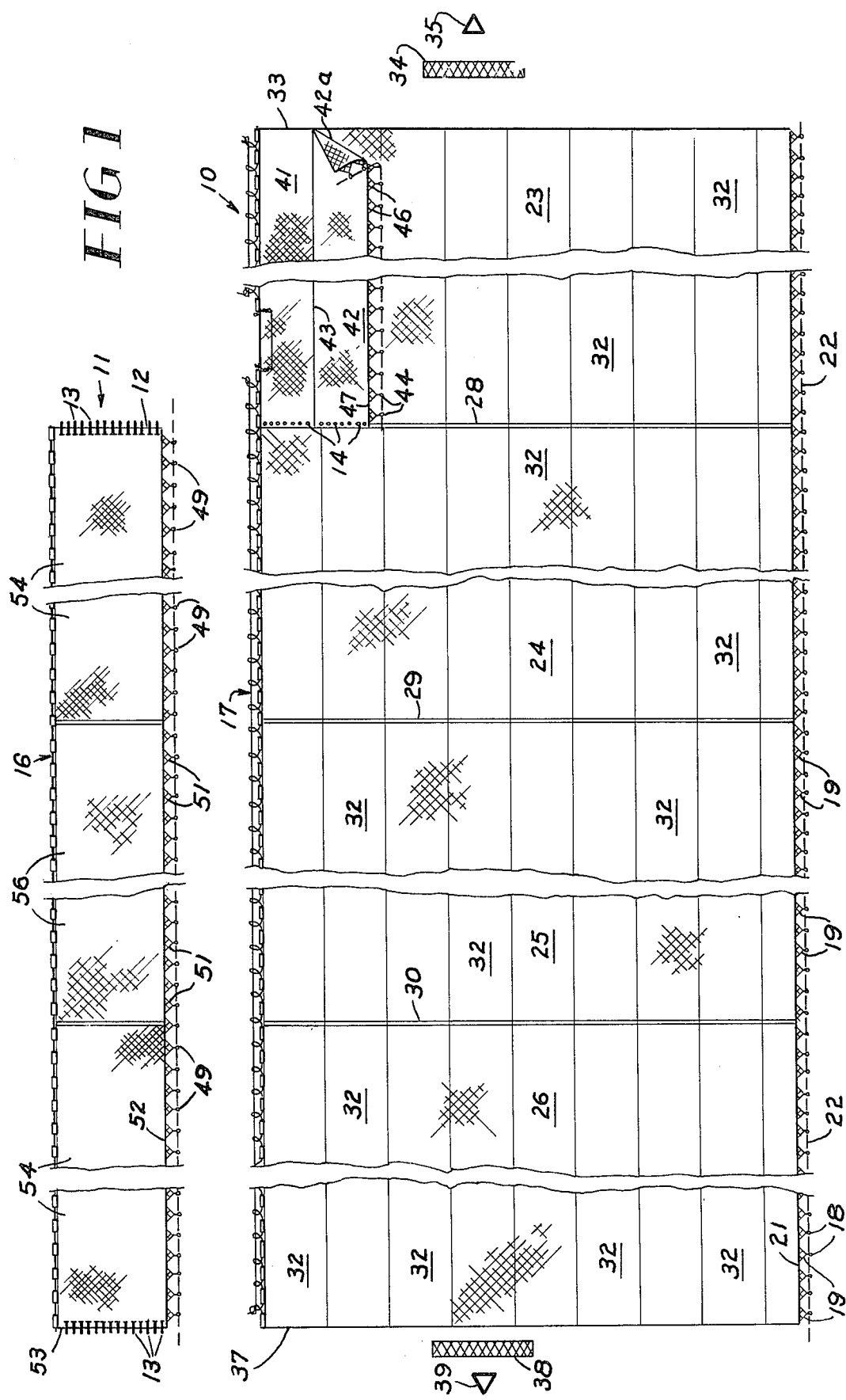
FIG. 1 is a somewhat diagrammatic elevational view of a main net and a porpoise net of a tuna purse seine according to the invention, shown with portions of their length removed and with the porpoise net disconnected from the main net.

In the drawings, FIG. 1 shows a tuna purse seine including a main net 10 and a smaller porpoise net 11 adapted for connection to the main net via the front or bunt end 12 of the porpoise net, which includes a row of releasable non-fouling type snap hooks 13 with no external projections when closed (not illustrated in detail in FIG. 1). For this connection the main net 10 includes a row of rings 14 positioned to receive the snap hooks 13. Thus, when the nets are connected a corkline or float line 16 of the porpoise net 11 lies parallel and even with a corkline 17 of the main net, in the position in which the two nets are suspended in the sea during setting.

Each of the nets also includes means for pursing, or drawing the net together, at its bottom. The main net 10, which is of a size typical of tuna purse seines, perhaps about one-half mile long and about 250 to 350 feet deep, includes a set of preferably split or openable type purse rings 18 connected via chain bridles 19 to a lead line 21 attached to the net's bottom in the usual manner. The lead line, along with the chain bridles and purse rings, supplies the weight necessary to sink the net and hold it nearly vertically during setting. When the net is set in a generally circular or cylindrical configuration, a purse line 22 (dashed lines) is drawn from both ends to pull the purse rings 18 and the net bottom together.

Tuna nets are normally made from several panels of netting, usually four as shown, denoted 23, 24, 25 and 26 and connected together at first, second and third cutting strips 28, 29 and 30. Each panel in turn normally consists of a plurality of body strips 32, but this detail of construction is not pertinent to the present invention.

The front or bunt end 33 of the net does not assume the rectangular position shown when being towed by a seining skiff as discussed above. It is normally gathered and fastened to a small strip of net 34 known as a net end, the front end of which is in turn gathered and fastened to a triangle end bracket 35 for connection to a towing line (not shown) from the skiff. Thus, in tow a portion of the net 10 adjacent to the bunt end 33 is gathered and somewhat triangular in shape, although the net is shown developed in FIG. 1 for clarity. At the rear or hauling end 37 of the net are a rear net end 38 and triangle end bracket 39, for connection to a line on the seining vessel for holding the hauling end during pursing and hauling the net aboard the vessel following pursing, as described above.

As described thus far, the main net 10 is typical of tuna purse seines which have been used heretofore in the tuna fishing industry.

The main net 10 of the invention includes some modifications to a typical tuna purse seine in the first panel 23 lying between the bunt end 33 and the first cutting strip 28. Most of the webbing in the main net is of typical size for tuna fishing, e.g. 4⅛-inch nominal mesh size. However, in an upper panel 41 of the panel 23 is webbing of a smaller mesh size, sufficiently small to avoid snagging of and damage to porpoise swimming thereagainst. Such a mesh might be of about 1¼-inch nominal size, for example. Suspended at the lower boundary of this small-mesh panel 41 is preferably provided a pursing skirt 42 of similar small mesh size. The pursing skirt 42 is connected to the rest of the main net only along its upper edge 43; it hangs therefrom and is not connected at either end or at its bottom edge. As indicated by a skirt corner 42a shown turned back in FIG. 1, the normal larger-sized main net mesh lies behind the depending skirt 42.

Along the bottom of the pursing skirt 42 are purse rings 44 which may be connected to the skirt by means of chain bridles 46 and a lead line 47 similarly to the row of purse rings 18 at the bottom of the main net. These purse rings, chain bridles and lead line are seen in greater detail in FIG. 2.

It should be understood that although the inclusion of the pursing skirt 42 is preferred, it is not absolutely necessary to the effectiveness of the seine or of the method of the invention. The skirt may be replaced by the provision of a deeper small-mesh panel 41, to the depth of the skirt 42 described, with purse rings depending from the bottom of the panel (not shown).

Figure 2:
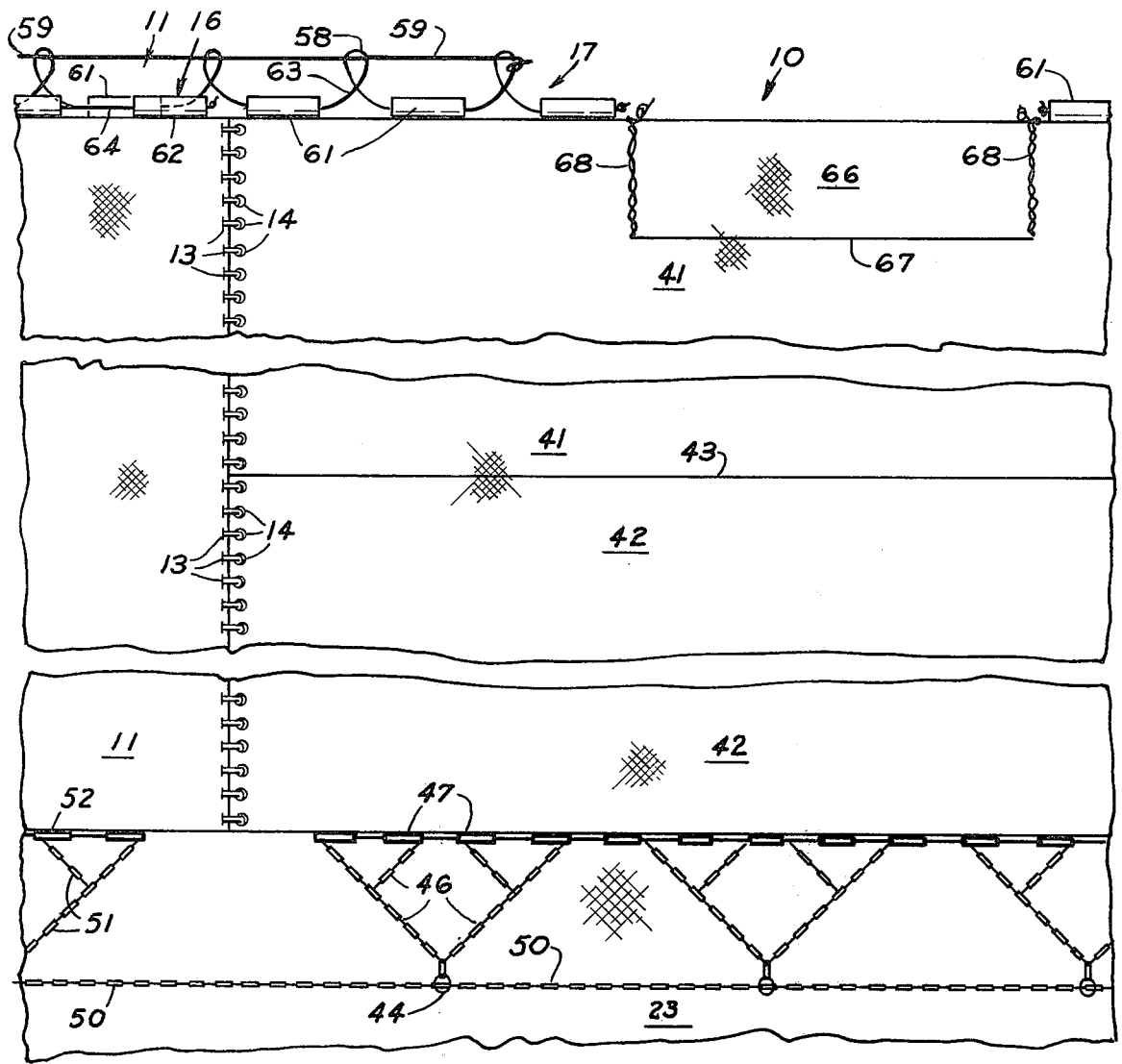
FIG. 2 is an enlarged diagrammatic view of a front portion of the main net, shown with the porpoise net connected as when the seine is set.

On a vertical line defined by the rear edge of the small-mesh upper panel 41 and the rear edge of the pursing skirt 42 are the column of rings 14 for receiving the snap hooks 13 schematically indicated at the front end of the porpoise net 11. The rings 14 preferably follow the first cutting strip 28 down to the top of the pursing skirt, and continue down the pursing skirt, being attached only to the rear edge of the pursing skirt from its top to its bottom. When the snap hooks 13 of the porpoise net are connected to the rings 14 of the main net (including the skirt 42), the purse rings 44 of the skirt from a continuous line with openable or split type purse rings 49 connected at the lower edge of the porpoise net, preferably via chain bridles 51 and a lead line 52 as with the main net purse rings 18. FIG. 2 shows these in greater detail, with a purse line 50 indicated for pursing the porpoise net and pursing skirt.

The depth of the porpoise net, which coincides with the depth of the small mesh portions 41 and 42 of the main net, is selected to be sufficient to trap the surface-gathering porpoise when pursed, but not to penetrate deeply enough to sweep appreciable quantities of tuna up into the porpoise net. A depth of about 70 to 80 feet may be optimum in most waters where Yellowfin tuna are found. The depth to which the tuna sound when trapped may depend to some extent upon the thermocline, as mentioned above. When pursed, a net of 70 to 80 feet unpursed depth would have a maximum depth of about 50 to 60 feet.

As discussed above, the porpoise net 11 is preferably symmetrical so as to have interchangeable ends. Thus, a rear end 53 of the net as shown in FIG. 1 is actually identical with the front end 12 and is provided with a series of snap hooks 13 for connection to the rings 14 of the main net. All of the webbing of the net 11 is preferably of smaller mesh than the normal large size (usually 4⅛-inch) mesh of typical tuna seines used heretofore and of most of the main net 10 of the present seine. However, for reasons of economy of webbing material and weight of the net, only front and rear sections 54 of the porpoise net are preferably formed of the small mesh used in the main net panel 41 and skirt 42; a middle section 56 may be of somewhat larger mesh (e.g., about 2½-inches nominal size). This middle section, which may comprise about one third of the porpoise net 11, is not as directly involved in the confinement of porpoise as is end section 54 adjacent to the pursing skirt 42 of the main net, but is sufficiently small to avoid snagging in most instances. The length of the porpoise net is preferably such that the rear ends of the two nets coincide when the nets are connected.

The reason for the preferred symmetry of the porpoise net relates to stacking and setting operations. When the porpoise net is hauled in and stacked in a separate stack (disconnected) from the main net, it may be reassembled to the main net at its opposite, more accessible end prior to the next set.

FIG. 2 shows greatly enlarged a portion of the assembled main and porpoise nets 10 and 11, including the small-mesh upper 41 and pursing skirt 42 of the main net, with part of the depth of the nets removed because of space limitations. As indicated, the corkline 16 of the porpoise net lies adjacent to the corkline 17 of the main net. The porpoise net corkline 16 preferably does not include pursing capability, as has been common with previous tuna seine corklines for the purpose of gathering the corkline in localized areas to prevent sinking. The main net corkline 17 of the present seine may include pursing rings 58 and a cork purse line 59 if desired. Floats 61 and 62 of the main net corkline and porpoise net corkline, respectively, may comprise series of float discs tied together by lines 63 and 64 in the manner common with prior seines, but these series are shown schematically as larger floats in the drawings.

Also indicated in FIG. 2 is a porpoise release gate 66 positioned in the small-mesh upper panel 41 of the first main net panel 23. The release gate 66 simply comprises a preferably rectangular section of mesh adjacent to the water surface, free from the adjacent webbing at its two ends but connected at its lower boundary to form a "hinge" line 67. To retain the gate closed, any surface-releasable device may be provided, such as a pair of tie lines 68 interwoven through the mesh of both the gate and the adjacent webbing at each end of the gate. Each tie line 68 may be affixed at one end to the corkline 17, which is interrupted at the release gate 66, woven down through the meshes and back up to the surface, and releasably connected at its second end to the corkline or to the top of the gate. Thus, when the gate is to be opened to release porpoise a crew member in a skiff can release the second ends of the tie lines and pull them out from the meshes, allowing the release gate to fall open.

Figure 3:
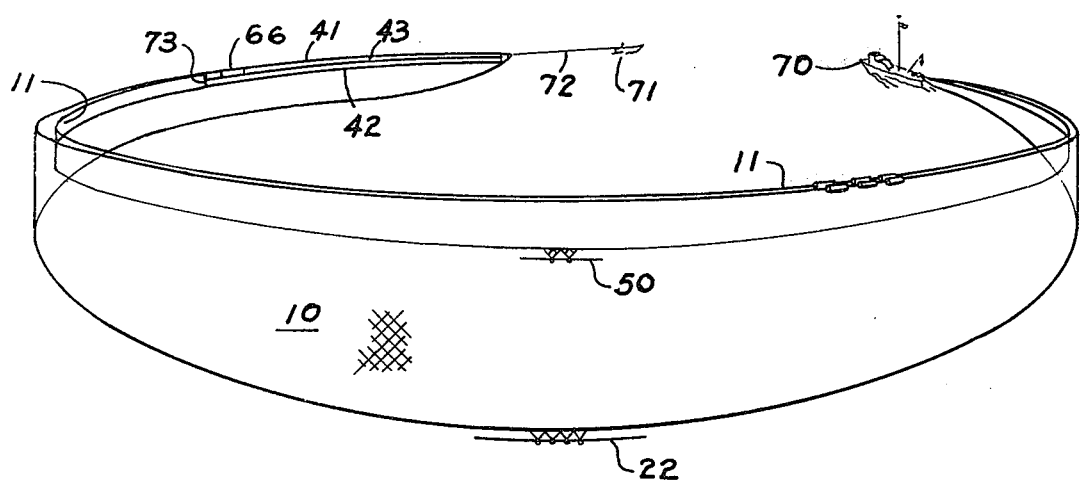
FIG. 3 is a perspective view of the purse seine of the invention being set by a seining vessel and a skiff, also somewhat diagrammatic and not to scale.

FIGS. 3 through 7 illustrate the method of the invention using the porpoise-releasing seine apparatus described above. In FIG. 3 a seining vessel 70 is advancing while releasing the main and porpoise nets 10 and 11 alongside one another, while a skiff 71 tows the bunt end of the main net via a line 72 connected to the triangle end bracket 35 shown in FIG. 1. The vessel 70 and the skiff 71 each travel in generally arcuate paths, or paths designed to efficiently surround the school of fish, according to the usual procedure of typical tuna seining operations. The porpoise net 11 is connected to the main net 10 along a vertical line 73 by the snap hooks 13 and rings 14 as described above, and it stays closely adjacent to the main net during the set. The porpoise releasing gate 66, preferably close to the rear end of the small-mesh panel 41, is closed during the set. The purse lines 22 and 50 are assembled through the respective sets of purse rings, with their ends retained on the seining vessel 70 and the skiff 71.

Figure 4:
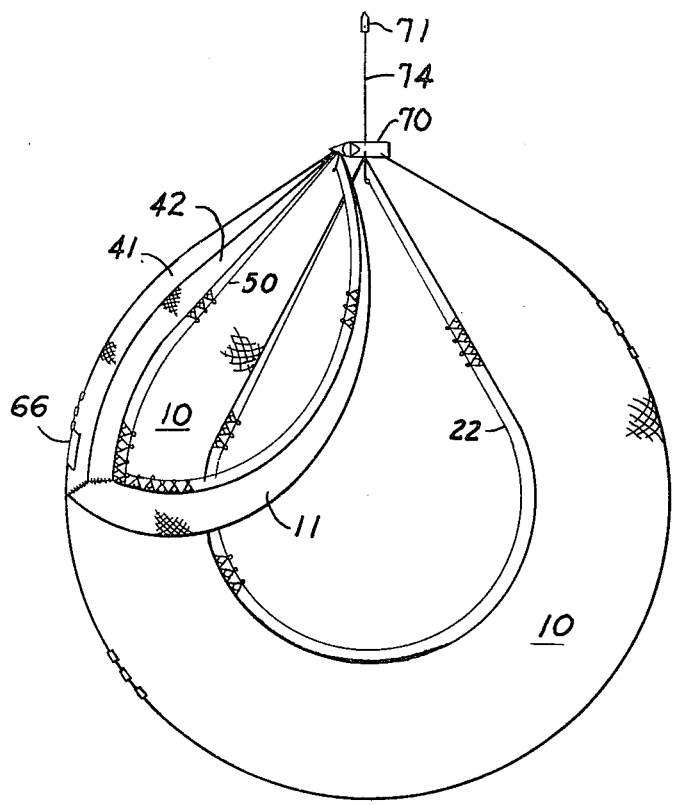
FIG. 4 is a diagrammatic plan view of the set seine as the main net and porpoise net are being pursed.

In FIG. 4 the bunt end of the main net has been brought to the port side of the vessel 70 near the bow, the hauling end of the main net is retained at an aft location on the port side, and the rear end of the propoise net is retained to the port side adjacent to the bunt end of the main net. The two nets are being pursed by drawing in the ends of the purse lines 22 and 50. For this purpose winch drums at about the middle of the port side and toward the bow of the port side of the vessel 70 may be provided. Since the drawing of the purse lines tends to pull the vessel 70 toward the seine, the seining skiff 71 or another skiff may be used to hold the main vessel 70 from moving toward the seine as shown by means of a line 74 connected to the starboard side of the main vessel.

Figure 5:
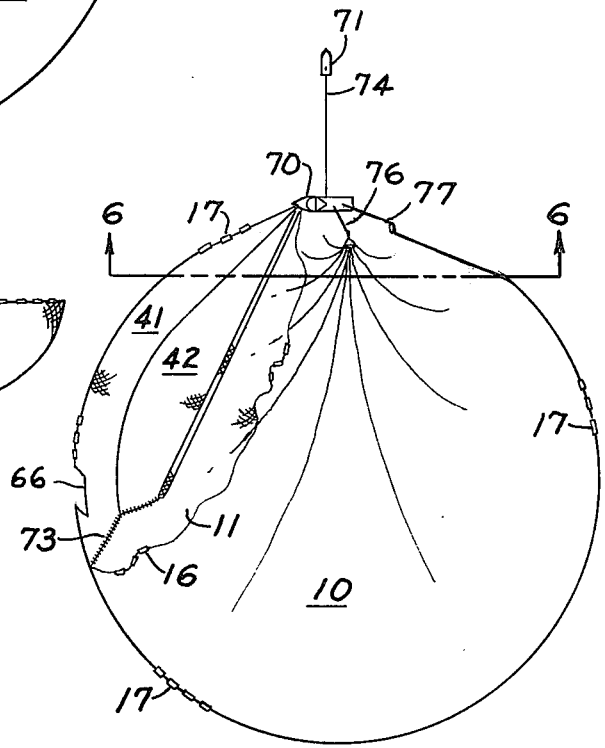
FIG. 5 is a diagrammatic plan view of the seine with both nets pursed.

As indicated in FIGS. 4 and 5, the pursing of the nets draws each of them together. The set main net forms a rough circle or cylinder which may be of about 800 feet diameter, so that when it is pursed together at its bottom its corkline must draw inwardly considerably. The porpoise net, however, being of much lesser depth, must draw inwardly to a much greater extent as FIGS. 4 and 5 illustrate.

Figure 6:
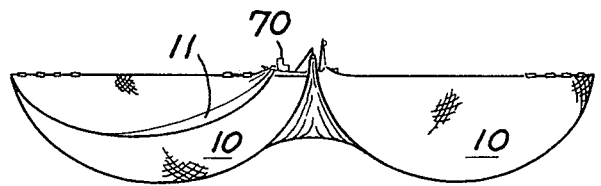
FIG. 6 is a diagrammatic sectional elevational view of the pursed nets taken along the line 6—6 of FIG. 5.

The purse line of the main net is hauled in on a winch boom 76 until the bunched together purse rings are actually raised out of the water, as shown in FIGS. 5 and 6. Then they are brought onto the deck and held there so that they can be successively disengaged from the purse line (they may be opened to disengage them) and fed into the stack of main netting as it is hauled in from its rear or hauling end 37. This hauling or shortening operation, which commences after pursing is completed, is accomplished in the usual way, preferably by means of a so-called "power block" which may be mounted on a second boom 77.

While the main net is being pursed, the porpoise net is pursed into generally the configuration shown in FIGS. 5 and 6, although it would actually have an extremely slackened corkline 16, much of the corkline lying gathered alongside the seining vessel 70. Pursing of the porpoise net may be used of an additional winch (not shown in detail) mounted near the port bow. The purse line 50 of the porpoise net is preferably not drawn to the extent of pulling the purse rings out of the water.

When the nets have been pursed as shown in FIG. 5, the porpoise release gate 66 may be opened to release the porpoise trapped in the pursed enclosure formed by the porpoise net 11 and the pursing skirt 42 and small-mesh panel 41 of the main net. This enclosure is relatively shallow and porpoise are able to find the gate 66, which may be about ten feet deep, fairly easily. However, crew members in a skiff may be needed to help direct the porpoise out the gate with poles or other devices.

Figure 7:
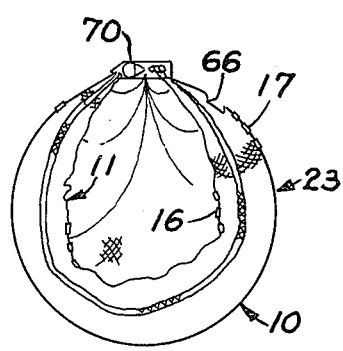
FIG. 7 is a diagrammtic plan view of the seine when it has been shortened by hauling from its back end to the point of connection between the main net and the porpoise net.

As discussed above, hauling of the main net onto the aft deck of the vessel continues until the junction point 73 of the main and porpoise nets is reached. The general configuration of the two nets at this time is schematically illustrated in FIG. 7. As indicated, all that remains of the main net is the first panel 23 from the bunt end 33 (attached to the vessel's bow) to the first cutting strip 28, including the small mesh panel 41, the pursing skirt 42 (pursed to the porpoise net 11) and the open porpoise release gate 66. The trapped tuna are isolated from the open gate 66 by the porpoise net, which lies inside the main net's first panel. The porpoise net is of course extremely slackened, and may be gathered alongside the vessel 70. FIG. 7 only schematically indicates the position and configuration of the porpoise net at this time.

Sacking up procedures can now proceed by further gathering of the two nets by crew members on the vessel 70 and in skiffs, until the tuna are concentrated in a small enough space to begin brailing them aboard. However, hauling of the nets aboard the aft deck preferably continues until the enclosure defined by the nets is much smaller. This may be accomplished by proceeding with the stacking of the main net as previously described; disconnecting the porpoise net from the main net when the junction line 73 has been brought aboard; and separately stacking the porpoise net while successively disconnecting the openable porpoise purse rings to separate the hauled porpoise netting from the hauled main netting. Of course the porpoise release gate 66 should be resecured when this part of the main net is brought aboard. In this way the desired concentration of fish may be reached by operations aboard the main vessel 70. Only when the tuna are confined in a very small remainder of the nets (not illustrated) does gathering and sacking up by crews members in one or more skiffs commence. The sacking then proceeds as in previous practice involving single tuna seines, with the upper inside portion of the enclosure being formed by the outside of the porpoise net 11.

When brailing of tuna has been completed, the purse lines are released, the bunt end of the main net is released from the bow of the seining vessel 70, and the remaining portions of the two nets are hauled onto the deck and stacked as previously described. Because hauling of the porpoise net did not commence until most of the main net had been hauled aboard and stacked, a much greater length of porpoise net than main net remains to be hauled when sacking up and brailing operations are finished.

The above described preferred embodiment provides a tuna seining apparatus and method for setting upon, capturing and harvesting a school of tuna with substantially no incidental porpoise damage or mortality, and without time and labor consuming "back down" procedures or other impractical methods devised previously to reduce porpoise kill. Various other embodiments and alterations to this preferred embodiment will be apparent to those skilled in the art and may be made without departing from the spirit and scope of the invention as defined in the following claims.

I claim:

1. A tuna purse seine, comprising:
    a main net having an upper corkline and a lower lead line, with purse rings connected to the lead line, most of the webbing of said main net being of a predetermined mesh size suitable for capturing tuna, said net having one area of webbing with a mesh size sufficiently small to avoid damaging and snagging of porpoise coming in contact therewith, said one webbing area being adjacent to one end of the net and extending from the corkline down through a portion of the depth of the net and said one webbing area including means for releasing porpoise below the water line;
    said main net further including a pursing skirt of webbing generally similar in mesh size to said one webbing area of the main net, said skirt depending from the interior side of the main net generally along a line below and spaced from the corkline, its bottom being of less depth than the bottom of the main net, the position of the pursing skirt being such that all of the main net webbing above the pursing skirt is in said one webbing area, said pursing skirt including purse rings along its lower edge;
    a porpoise net for connection to the interior side of the main net, of a length generally corresponding to that of the main net less that of the pursing skirt, and of a depth generally corresponding to the depth distance between the corkline and the bottom of the pursing skirt, said porpoise net having, at least in an area adjacent to one end, webbing of mesh size sufficiently small to avoid damaging and snagging of porpoise coming into contact therewith, said porpoise net including a corkline along its upper edge and a lead line and purse rings along its lower edge; and
    means for connecting said one end of the porpoise net to the main net, between the pursing skirt and the corkline, and to the end of the pursing skirt opposite said one end of the main net along a generally vertical line, so that the porpoise net purse rings and the pursing skirt purse rings are generally aligned and continuous for receiving a common purse line; whereby said porpoise net and pursing skirt may be pursed while said main net is independently pursed, dividing off an upper portion of the enclosed main net space and locating the divided-off portion, when the porpoise net and pursing skirt are pursed, adjacent to the porpoise releasing means so that porpoise trapped therein can be released.

2. The tuna purse seine of claim 1 wherein said porpoise-releasing means comprises a normally closed section of net extending down from the corkline, with means for releasing the section to allow it to fall open to enable porpoise to escape.

3. The tuna purse seine of claim 2 wherein said means for releasing the section is operable from above the water surface.

4. The tuna purse seine of claim 2 wherein said normally closed net section is generally rectangular in shape and said means for releasing the section comprises a release line at each end of the section interwoven with the webbing at the end of the section and the adjacent main net webbing, both ends of the release line being connected to the corkline, one such connection being releasable.

5. The tuna purse seine of claim 1 wherein the porpoise net includes opposite end sections which are similar to one another, each comprising said webbing of mesh size sufficiently small to avoid damaging and snagging of porpoise.

6. The tuna purse seine of claim 5 wherein each end of the porpoise net has connected to it a plurality of releasable snap hooks for selectively connecting either end of the porpoise net to the main net along said generally vertical line associated with said one webbing area and the pursing skirt, and said net has connected to it, along said generally vertical line, a corresponding plurality of rings for engagement by the snap hooks, said snap hooks and rings serving as said means for connecting.

7. The tuna purse seine of claim 5 wherein said porpoise net further includes a middle net section between the opposite end sections, of larger webbing mesh than that of the end sections.

8. The tuna purse seine of claim 7 wherein said larger webbing mesh of said middle section is smaller than said predetermined mesh size suitable for capturing tuna.

9. The tuna purse seine of claim 1 wherein said means for connecting comprises a plurality of snap hooks on said one end of the porpoise net and a corresponding plurality of rings for engagement by the snap hooks on the main net along said generally vertical line associated with said one webbing area and the pursing skirt.

10. The tuna purse seine of claim 1 wherein the depths of the bottom of the porpoise net and the bottom of the pursing skirt, when the nets are set and unpursed, are about 50 to 80 feet.

11. The tuna purse seine of claim 1 wherein the distance from the top of the pursing skirt to the bottom of the pursing skirt is about half the depth of the bottom of the pursing skirt, when the main net is set and unpursed.

12. The tuna purse seine of claim 1 wherein said one webbing area has a mesh size at least as small as about 1¼-inch.

13. The tuna purse seine of claim 1 wherein most of the webbing of the main net is of about 4⅛-inch mesh, and said one webbing area and said pursing skirt are of about 1¼-inch mesh.

14. A tuna purse seine, comprising:
a main net having an upper corkline and having a lead line and purse rings along its lower edge, most of the webbing of said main net being of a predetermined mesh size suitable for capturing tuna, said net having one area of webbing with mesh size sufficiently small to avoid damaging and snagging of porpoise coming in contact therewith, said one webbing area extending through only a portion of the length of the net extending from the corkline down through a portion of the depth of the net and said one webbing area including means for releasing porpoise below the water line;
a row of upper purse rings in a generally horizontal line on the interior side of the main net, spaced above the purse rings at the lower edge of the main net, the position of said upper purse rings being such that all of the main net webbing above the upper purse rings is in said one webbing area;
a porpoise net for connection to the interior side of the main net, of a length generally corresponding to that of the main net less that of the row of upper purse rings, and of a depth generally corresponding to the depth distance between the corkline and the upper purse rings, said porpoise net having, at least in an area adjacent to one end, webbing of mesh size sufficiently small to avoid damaging and snagging of porpoise coming into contact therewith, said porpoise net including a corkline at its upper edge and a lead line and purse rings along its lower edge; and
means for connecting said one end of the porpoise net to the main net, between the upper purse rings and the main net corkline along a generally vertical line, so that the porpoise net purse rings and the upper purse rings are generally aligned and continuous for receiving a common purse line;
whereby said porpoise net and the portion of the main net above said upper purse rings may be pursed while said main net as a whole is independently pursed, dividing off an upper portion of the enclosed main net space and locating the divided-off portion, when the porpoise net is pursed, adjacent to the porpoise releasing means so that porpoise trapped therein can be released.

15. A method for seining tuna and releasing porpoise captured therewith, comprising:
providing, in conjunction with a main purse net, a porpoise purse net having an independent corkline and of substantially less depth than the main net, connected to the main net along a generally vertical juncture extending downward from the corkline and spaced from the bunt end of the main net, the porpoise net extending back substantially to the hauling end of the main net, the main net including a row of purse rings at the level of the porpoise net's lower edge, between the vertical juncture and the bunt end of the main net;
setting the two nets together about a group of fish, with the porpoise net parallel and closely adjacent to the main net;
pursing the main net and the porpoise net, thereby sweeping the porpoise net and enclosed porpoise into an area adjacent to and generally between the vertical juncture of the two nets and the seining vessel; and
providing in the main net an exit opening for porpoise, between the vertical juncture and the seining vessel.

16. The method of claim 15 which further includes sacking the tuna caught in the main net by hauling in the main net from the hauling end at least to the juncture of the nets, resulting in a smaller enclosure defined by the outside of the porpoise net and the portion of the inside of the main net below the porpoise net, and gathering the nets to concentrate the tuna in a small area of the nets.

* * * * *

UNITED STATES PATENT AND TRADEMARK OFFICE
CERTIFICATE OF CORRECTION

PATENT NO. : 4,006,549
DATED : February 8, 1977
INVENTOR(S) : James M. Seabrooke It is certified that error appears in the above-identified patent and that said Letters Patent are hereby corrected as shown below:

Column 2, Line 32 delete "restored"; Column 3, Line 67 change "when" to --which--; Column 4, Line 16 insert --the-- between "into" and "seining"; Column 6, Line 9 change "from" to --form--; Column 8, Line 15 change "used" to --by use of--; Column 10, Line 34 insert --main-- between "said" and "net"; and change applicant's address from:

"1550 Mountain View Ave., Petaluma California 94952"

to:

--813 South Lee Street, Fitzgerald, Georgia 31750--.

Signed and Sealed this

Twenty-fourth Day of May 1977

[SEAL]

Attest:

RUTH C. MASON
*Attesting Officer*

C. MARSHALL DANN
*Commissioner of Patents and Trademarks*